United States Patent
Wang

(10) Patent No.: US 10,438,004 B2
(45) Date of Patent: Oct. 8, 2019

(54) DUAL-SYSTEM ELECTRONIC APPARATUS AND TERMINAL

(71) Applicant: Yulong Computer Telecommunication Scientific (Shenzhen) Co., Ltd., Shenzhen, Guangdong (CN)

(72) Inventor: Baolei Wang, Guagdong (CN)

(73) Assignee: Yulong Computer Telecommunications Scientific (Shenzhen) Co., Ltd., Shenzhen (CN)

(*) Notice: Subject to any disclaimer, the term of this patent is extended or adjusted under 35 U.S.C. 154(b) by 179 days.

(21) Appl. No.: 15/441,007

(22) Filed: Feb. 23, 2017

(65) Prior Publication Data

US 2017/0161507 A1    Jun. 8, 2017

Related U.S. Application Data

(63) Continuation-in-part of application No. PCT/CN2014/092614, filed on Nov. 29, 2014.

(30) Foreign Application Priority Data

Aug. 29, 2014    (CN) .......................... 2014 1 0438051

(51) Int. Cl.
*G06F 21/60* (2013.01)
*G06F 9/48* (2006.01)
(Continued)

(52) U.S. Cl.
CPC .............. *G06F 21/602* (2013.01); *G06F 1/32* (2013.01); *G06F 9/48* (2013.01); *G06F 21/57* (2013.01);
(Continued)

(58) Field of Classification Search
CPC ........ G06F 21/602; G06F 21/74; G06F 21/57; G06F 1/32; G06F 9/48; G06F 21/6281; G06F 9/4843
See application file for complete search history.

(56) References Cited

U.S. PATENT DOCUMENTS 7,996,682 B2 *  8/2011  Schutz ................... G06F 21/57
                                                        709/227
8,239,667 B2 *  8/2012  Durham ............... G06F 1/3203
                                                        711/153
(Continued)

FOREIGN PATENT DOCUMENTS

CN    103391374 A    11/2013
CN    103413089 A    11/2013
CN    103473132 A    12/2013

OTHER PUBLICATIONS

Peter Wilson et al: "Implementing Embedded Security on Dual-Virtual-CPU Systems", IEEE Design & Test of Computers, IEEE Service Center, New York, NY, US, vol. 24, No. 6, Nov. 1, 2007 (Nov. 1, 2007), pp. 582-591, XP011198558, ISSN: 0740-7475, DOI: 10.1109/MDT.2007.196; p. 583, left-hand column; figure 1.

*Primary Examiner* — Michael R Vaughan
(74) *Attorney, Agent, or Firm* — Young Basile Hanlon & MacFarlane, P.C.

(57) ABSTRACT

A dual-system electronic apparatus and a terminal include an open operating system and an encryption operating system, and further include: a first processor used for correspondingly processing data of the open operating system; a second processor used for correspondingly processing data of the encryption operating system; and a communication unit coupled to the first processor and the second processor, the communication unit being used for data interaction with the exterior. During running, the electronic apparatus can receive an instruction, the open operating system is set as a
(Continued)

running system, and the encryption operating system runs in background; or the encryption operating system is set as the running system, and the open operating system runs in background.

19 Claims, 3 Drawing Sheets

(51) Int. Cl.
*G06F 1/32* (2019.01)
*G06F 21/57* (2013.01)
*G06F 21/74* (2013.01)
*G06F 21/62* (2013.01)

(52) U.S. Cl.
CPC ............ *G06F 21/74* (2013.01); *G06F 9/4843* (2013.01); *G06F 21/6281* (2013.01)

(56) References Cited

U.S. PATENT DOCUMENTS

| | | | | |
|---|---|---|---|---|
| 8,347,131 B2* | 1/2013 | Cupps | ................... | G06F 1/1626 713/320 |
| 8,370,431 B1* | 2/2013 | Wang | ................ | H04L 29/06421 709/203 |
| 8,613,045 B1* | 12/2013 | Shigapov | ................ | H04L 63/08 726/3 |
| 8,831,567 B2* | 9/2014 | Kim | ................... | G06F 21/6218 455/411 |
| 8,924,979 B2* | 12/2014 | Tanaka | .................. | G06F 9/4843 718/102 |
| 9,372,714 B2* | 6/2016 | Hara | ................... | G06F 9/45558 |
| 9,489,505 B2* | 11/2016 | Heider | .................... | G06F 21/84 |
| 2003/0135771 A1* | 7/2003 | Cupps | ................... | G06F 1/1626 713/320 |
| 2004/0025045 A1* | 2/2004 | Chan | ..................... | G06F 9/4843 726/16 |
| 2005/0223225 A1* | 10/2005 | Campbell | ........... | G06F 21/6281 713/166 |
| 2007/0101435 A1* | 5/2007 | Konanka | .................. | G06F 21/52 726/27 |
| 2009/0210874 A1* | 8/2009 | Harris | ................... | G06F 9/4552 718/1 |
| 2009/0241189 A1* | 9/2009 | Shanbhogue | ........... | G06F 13/26 726/23 |
| 2010/0031320 A1* | 2/2010 | Bhesania | ................ | G06F 21/83 726/4 |
| 2012/0246641 A1* | 9/2012 | Gehrmann | .............. | G06F 9/445 718/1 |
| 2012/0331464 A1* | 12/2012 | Saito | ...................... | G06F 9/5077 718/1 |
| 2013/0125126 A1* | 5/2013 | Yokota | ...................... | G06F 9/48 718/102 |
| 2013/0227269 A1* | 8/2013 | Ting | ........................ | H04L 9/12 713/100 |
| 2014/0122902 A1* | 5/2014 | Isozaki | ............... | G06F 12/1408 713/193 |

\* cited by examiner

DUAL-SYSTEM ELECTRONIC APPARATUS AND TERMINAL

CROSS-REFERENCE TO RELATED APPLICATION(S)

This application is a continuation-in-part of International Application No. PCT/CN2014/092614 filed on Nov. 29, 2014, which claims priority of Chinese Patent Application No. 201410438051.2 filed on Aug. 29, 2014, the contents of both of which are herein incorporated by reference in their entireties.

TECHNICAL FIELD

The present disclosure relates to communication technology field, and particularly to a dual-system electronic apparatus and a terminal.

BACKGROUND

With the development of communication technology, various communication electronic devices have been popularized. At the same time, user requirements for electronic apparatuses is increasingly high, for instance, data encrypting process of special applications, and application classification, and the like. Obviously, electronic apparatuses of an existing single-system cannot meet the needs of the user. On the other hand, electronic apparatuses of an existing dual-system might not be able to run two systems simultaneously and hardware reset operation is required upon system switching, which result in increased power consumption and bad user experience.

SUMMARY

The present disclosure aims to provide a dual-system apparatus with low power consumption and a terminal.

In order to achieve the above objectives, according to one aspect of the present disclosure, it is provided a dual-system electronic apparatus. The apparatus has an open operating system and an encryption operating system, and includes: a first processor, configured to process data of the open operating system correspondingly; a second processor, configured to process data of the encryption operating system correspondingly; and a communication unit, coupled to the first processor and the second processor and configured to conduct data interaction with the exterior.

During running of the electronic apparatus, instructions can be received, the open operating system is set as a running system and the encryption operating system runs in background; or the encryption operating system is set as the running system and the open operating system runs in background.

In the dual-system electronic apparatus according to the present disclosure, data of the open operating system includes data of routine applications of the electronic apparatus; data of the encryption operating system includes data of encryption applications of the electronic apparatus. The routine applications and the encryption applications can be set by user or set by default by the dual-system electronic apparatus.

In the dual-system electronic apparatus according to the present disclosure, if the data of encryption applications of the electronic apparatus is received at runtime of the open operating system, the user will be prompted to switch to the encryption operating system automatically.

In the dual-system electronic apparatus according to the present disclosure, the open operating system and the encryption operating system corresponding to a first storage device and a second storage device respectively; wherein the first storage device and the second storage device connects to the first processor and the second processor respectively.

In the dual-system electronic apparatus according to the present disclosure, the open operating system and the encryption operating system have shared data which can be set by the use or set by default.

The dual-system electronic apparatus according to the present disclosure further includes a third storage device configured to store the shared data of the open operating system and the encryption operating system. Furthermore, a switching circuit, which is configured to control switching between the open operating system and the encryption operating system of the dual-system electronic apparatus, can be included in the dual-system electronic apparatus according to the present disclosure.

In the dual-system electronic apparatus according to the present disclosure, the second processor is configured to perform encryption on the data of the encryption operating system.

In the dual-system electronic apparatus according to the present disclosure, the open operating system and the encryption operating system share the same peripheral equipment.

According to another aspect of the present disclosure, it is provided a terminal, which includes the dual-system electronic apparatus of the present disclosure.

In the technical scheme described above, two systems corresponding to two processors respectively are provided within an electronic apparatus, wherein these two processors are configured to handle data of the two systems respectively and are coupled to a communication unit so as to conduct data interaction with the exterior. Upon running of the electronic apparatus, one system can be selected to be a running system while the other system runs in background; therefore, system switching can be achieved conveniently in course of using of the electronic apparatus.

DETAILED DESCRIPTION

In order to more clearly understand the above object, features, and advantages of the present disclosure, it will be described in further detail with refer to the accompanying drawings and the following implementations. It should be noted that, the implementations and the features thereof can be combined with each other without confliction.

Implementation 1

Figure 1:
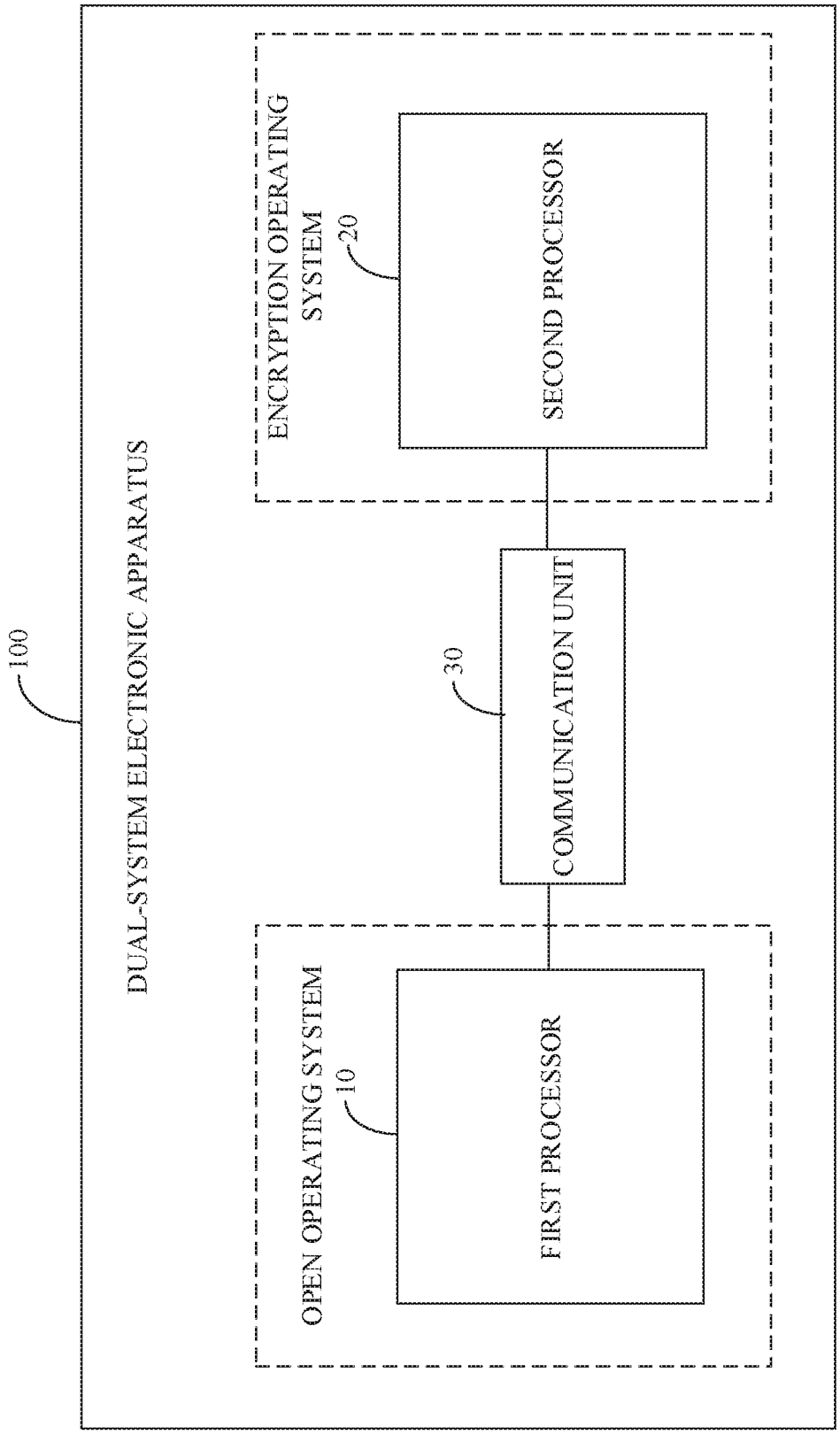
FIG. 1 is a structure schematic diagram illustrating a dual-system electronic apparatus according to an implementation of the present disclosure.

According to an implementation of the present disclosure, it is provided a dual-system electronic apparatus; FIG. 1 is a structure schematic diagram illustrating the apparatus. As shown in FIG. 1, a dual-system electronic apparatus 100 has an open operating system and an encryption operating system, and further includes a first processor 10, a second processor 20, and a communication unit (communicator) 30, which will be described in detail below.

First Processor 10

The first processor 10 is configured to process data of the open operating system correspondingly. The data mentioned here includes data of routine applications of the electronic apparatus 100. As an implementation, the routine applications can be set or customized by user. For example, applications such as video and game of the electronic apparatus 100 have no privacy and can be set as routine applications; the data thereof will be operated in the open operating system and will be handled by the first processor 10.

Second Processor 20

The second processor 20 is configured to process data of the encryption operating system correspondingly. The data mentioned here includes data of encryption applications of the electronic apparatus 100. As an implementation, the encryption applications can be set or customized by user. Take the electronic apparatus 100 as an example of a mobile terminal, applications such as short message, email, and call generally have privacy and can be set as encryption applications; the data thereof will be operated in the encryption operating system and will be handed by the second processor 20. Upon handling, the data of the encryption operating system, will be encrypted by the second processor 20 so as to ensure data security and protect personal privacy of the user.

As to the setting of routine applications and encryption applications, instead of set by user as described above, it can also be set by default by the dual-system electronic apparatus per se. In such a situation, routine applications set by default by the dual-system electronic apparatus will be handled in the open operating system while encryption applications set by default by the dual-system electronic apparatus will be handled in the encryption operating system.

Communication Unit 30

The communication unit 30 coupled to the first processor 10 and the second processor 20 and is configured to conduct data interaction with the exterior. The communication unit 30 can receive data of the first processor 10 and the second processor 20 and achieve communication interaction with other devices. It is understandable that the number of the communication unit 30 can be one or more.

As to the open operating system and the encryption operating system, after starting the electronic apparatus 100 for the first time, one of these two systems can be set as a default activation system, that is, the running system. The default activation system will be activated when the electronic apparatus 100 is started again and no selection is required at the boot-time.

In one implementation, after starting of the electronic apparatus 100, the open operating system and the encryption operating system can be started. At this time, an instruction(s) input by user can be received by the electronic apparatus 100, specifically, by the communication unit 30. According to the instruction, the open operating system will be set as the running system while the encryption operating system will run in background; or, the encryption operating system will be set as the running system while the open operating system will run in background. Alternatively, one of the open operating system and the encryption operating system can be set as the running system while the other can be set to a deep standby state. The deep standby state is a state in which only basic system data is running and which can be maintained with a little power consumption. In other words, no other program is running in this state.

The example in which the running system is set according to the instruction received has been illustrated. But the present disclosure is not limited thereto. The running system can be chosen and set by default by the dual-system electronic apparatus 100 either.

Implementation 2

Figure 2:
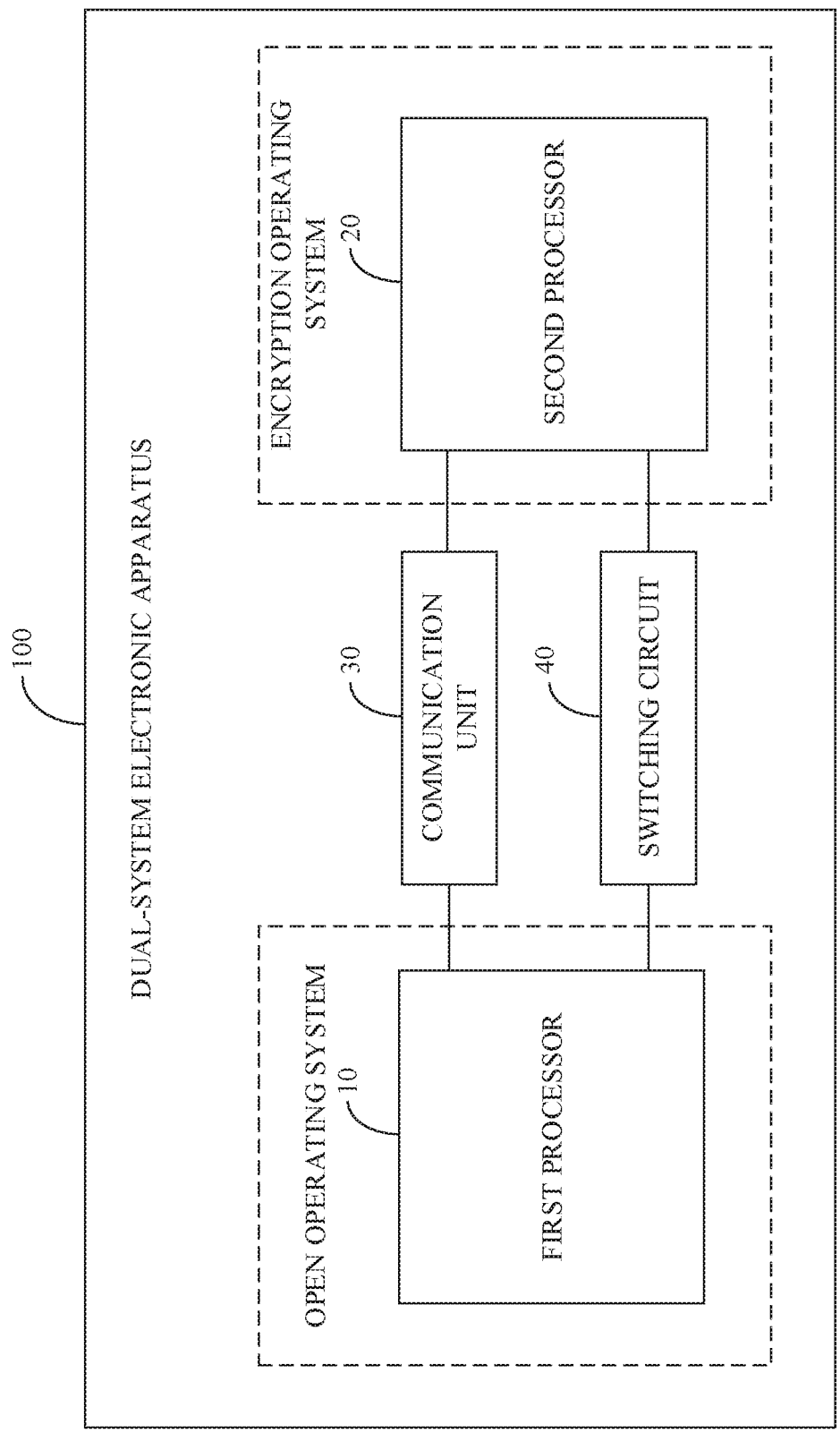
FIG. 2 is a structure schematic diagram illustrating a dual-system electronic apparatus according to another implementation of the present disclosure.

According to this implementation, as shown in FIG. 2, the dual-system electronic apparatus 100 further includes a switching circuit 40, which is configured to achieve system switching. Specifically, the process of setting one of the open operating system and the encryption operating system to be the running system according to the instruction received by the communication unit 30 as described above can be achieved by the switching circuit 40. Furthermore, the switching circuit 40 can control the electronic apparatus 100 to switch between the open operating system and the encryption operating system.

In one example, if data of encryption applications is received upon running of the open operating system of the electronic apparatus 100, the user will be prompted to switch to the encryption operating system automatically. For example, if information such as a short message or email is received when viewing a video, a prompt window will be popped up to inquiry the user whether to switch to the encryption operating system. If the user selects "yes", the electronic apparatus 100 will switch to the encryption operating system; otherwise, the promotion will be ignored. The user can enter into the encryption operating system through menu operation at other times. Similarly, if data of routine applications is received upon running of the encryption operating system, the user will be prompted whether to switch to the open operating system automatically. If the user selects "yes", the electronic apparatus 100 will switch to the open operating system; otherwise, the promotion will be ignored. Similarly, the user can enter into the open operating system through menu operation at other times.

In the dual-system electronic apparatus 100 according to implementation 2, restart is not needed for system switching; moreover, the extra current consumption is only 2-3 mA in the deep standby state. Therefore, system switching is convenient and power consumption is small, and user experience is improved correspondingly.

Implementation 3

Figure 3:
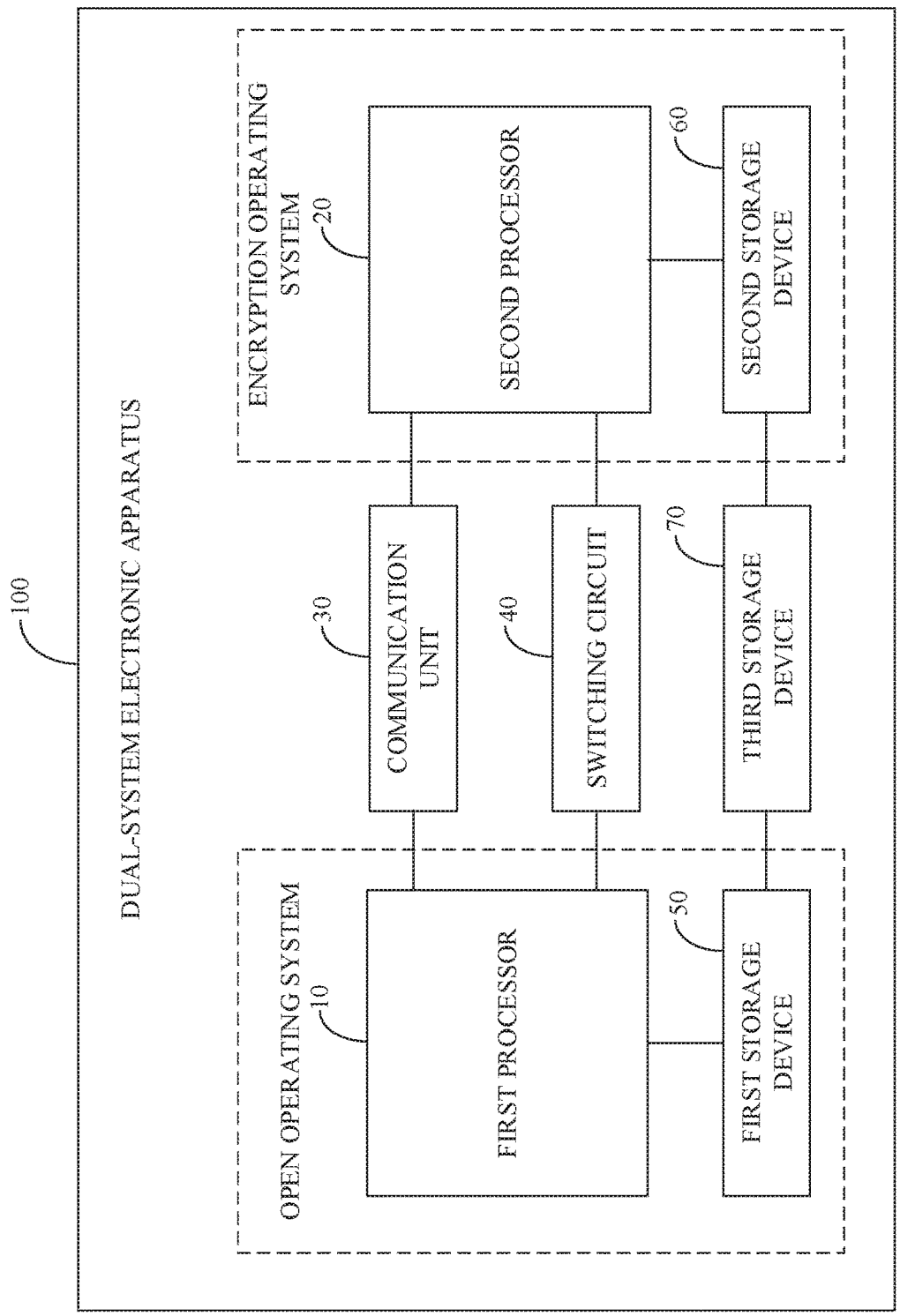
FIG. 3 is a structure schematic diagram illustrating a dual-system electronic apparatus according to a further implementation of the present disclosure.

In this implementation, the open operating system and the encryption operating system of the dual-system electronic apparatus 100 share the same peripheral equipment. In some sense, a system structure can be deemed as a file structure, for this purpose, as shown in FIG. 3, a first storage device 50 corresponding to the open operating system and a second storage device 60 corresponding to the encryption operating system is provided to store system data respectively. As can be seen from FIG. 3, the first storage device 50 and the second storage device 60 couples to the first processor 10 and the second processor 20 respectively. As an implementation, the first storage device 50 can be configured to store system files and/or data of the open operating system, and the second storage device 60 can be configured to store system files and/or data of the encryption operating system. Alternatively, data of the open operating system and data of the encryption operating system can be stored separately in another location.

In one implementation, the open operating system and the encryption operating system can share data, wherein the shared data can be set by user and/or set by default. The shared data is all or a part of the data of the open operating system. As one example, as shown in FIG. 3, in order to save storage space, a third storage device 70 for storing the shared data that can be invoked by the open operating system and the encryption operating system is provide between the first storage device 50 and the second storage device 60.

As another example, in the circumstances where the data of the open operating system is stored in the first storage device 50 as described above, the third storage device 70 can be omitted.

The first storage device 50, the second storage device 60, and the third storage device 70 can refer to various types of recording media capable of being accessed by the computer device via a network or communication link, and can be integrated or discrete. Examples thereof include non-volatile computer-readable storage medium and tangible computer-readable medium, such as magnetic hard disk drive, solid state hard disk, flash memory, USB thumb drive, RAM, ROM, and magneto-optical disk.

To summarize, in the dual-system electronic system according the implementations of the present disclosure, two systems corresponding to two processors respectively are provided within an electronic apparatus, wherein these two processors are configured to handle data of the two systems respectively and are coupled to a communication unit so as to conduct data interaction with the exterior. Upon running of the electronic apparatus, one system can be selected to be a running system while the other system runs in background; therefore, system switching can be achieved conveniently in course of using of the electronic apparatus.

Implementation 4

According to this implementation of the present disclosure, it is provided a terminal, which includes the dual-system electronic apparatus 100 according to any implementation illustrated above. The terminal has a similar structure to the electronic apparatus 100 and can be implemented with refer to the description thereof.

The foregoing descriptions are merely preferred implementations of the present disclosure, rather than limiting the present disclosure. Various modifications and alterations may be made to the present disclosure for those skilled in the art. Any modification, equivalent substitution, improvement or the like made within the spirit and principle of the present disclosure shall fall into the protection scope of the present disclosure.

What is claimed is:

1. A dual-system electronic apparatus having an open operating system and an encryption operating system, comprising:
    a first processor, configured to process data of the open operating system;
    a second processor, configured to process data of the encryption operating system, wherein the data of the encryption operating system comprises data of encryption applications of the dual-system electronic apparatus;
    a communicator coupled to the first processor and the second processor, configured to conduct data interaction with an exterior; and
    a switching circuit, configured to set one of the open operating system or the encryption operating system to be a running system while setting the other of the open operating system or the encryption operating system to run in background, according to an instruction received from the exterior upon running of the dual-system electronic apparatus by the communicator,
    wherein when the open operating system is set as the running system and the data of the encryption applications is received, a user is prompted to switch to the encryption operating system; and
    when the encryption operating system is set as the running system and the data of the routine applications is received, a user is prompted to switch to the open operating system.

2. The dual-system electronic apparatus of claim 1, wherein the data of the open operating system comprises data of routine applications of the dual-system electronic apparatus.

3. The dual-system electronic apparatus of claim 2, wherein the routine applications and the encryption applications are set by a user or set by default by the dual-system electronic apparatus.

4. The dual-system electronic apparatus of claim 1, further comprising:
    a first storage device, corresponding to the open operating system, and coupled to the first processor; and
    a second storage device, corresponding to the encryption operating system, and coupled to the second processor.

5. The dual-system electronic apparatus of claim 4, wherein the open operating system and the encryption operating system have at least one of shared data set by user or shared data set by default, and wherein the dual-system electronic apparatus comprises a third storage device, configured to store shared data of the open operating system and the encryption operating system.

6. The dual-system electronic apparatus of claim 1, wherein the switching circuit is further configured to control the dual-system electronic apparatus to switch between the open operating system and the encryption operating system.

7. The dual-system electronic apparatus of claim 1, wherein the second processor is configured to encrypt data of the encryption operating system.

8. The dual-system electronic apparatus of claim 1, wherein the open operating system and the encryption operating system share the same peripheral equipment.

9. The dual-system electronic apparatus of claim 1, wherein the switching circuit is configured to set one of the open operating system or the encryption operating system to be the running system while setting the other of the open operating system and the encryption operating system to be in a deep standby state.

10. A terminal comprising a dual-system electronic apparatus having an open operating system and an encryption operating system, the dual-system electronic apparatus further comprising:
    a first processor, configured to process data of the open operating system, wherein the data of the open operating system comprises data of routine applications of the dual-system electronic apparatus;
    a second processor, configured to process data of the encryption operating system, wherein the data of the encryption operating system comprises data of encryption applications of the dual-system electronic apparatus;
    a communicator, coupled to the first processor and the second processor and configured to conduct data interaction with an exterior; and
    a switching circuit, configured to set one of the open operating system or the encryption operating system to be a running system while setting the other of the open operating system and the encryption operating system to run in background according to an instruction received from the exterior upon running of the dual-system electronic apparatus by the communicator, wherein when the open operating system is set as the running system and the data of the encryption applications is received, a user is prompted to switch to the encryption operating system; and wherein when the encryption operating system is set as the running system and the data of the routine applications is received, a user is prompted to switch to the open operating system.

11. The terminal of claim 10, wherein the dual-system electronic apparatus further comprises:
a first storage device, corresponding to the open operating system, and coupled to the first processor; and
a second storage device, corresponding to the encryption operating system, and coupled to the second processor.

12. The terminal of claim 11, wherein the open operating system and the encryption operating system have at least one of shared data set by user or shared data set by default, and wherein the dual-system electronic apparatus comprises a third storage device, configured to store shared data of the open operating system and the encryption operating system.

13. The terminal of claim 10, wherein the routine applications and the encryption applications are set by a user or set by default by the dual-system electronic apparatus.

14. A dual-system electronic apparatus having an open operating system and an encryption operating system, comprising:
a first processor, configured to process data of the open operating system, wherein the data of the open operating system comprises routine applications of the dual-system electronic apparatus;
a second processor, configured to process data of the encryption operating system;
a communicator coupled to the first processor and the second processor, configured to conduct data interaction with an exterior; and
a switching circuit, configured to set one of the open operating system or the encryption operating system to be a running system while setting the other of the open operating system or the encryption operating system to run in background, according to an instruction received from the exterior upon running of the dual-system electronic apparatus by the communicator, wherein when the encryption operating system is set as the running system and the data of the routine applications is received, a user is prompted to switch to the open operating system.

15. The dual-system electronic apparatus of claim 14, wherein the data of the encryption operating systems comprises data of encryptions applications of the dual-system electronic apparatus, and wherein the routine applications and the encryption applications are set by a user or set by default by the dual-system electronic apparatus.

16. The dual-system electronic apparatus of claim 14, further comprising:
a first storage device, corresponding to the open operating system, and coupled to the first processor; and
a second storage device, corresponding to the encryption operating system, and coupled to the second processor,
wherein the open operating system and the encryption operating system have at least one of shared data set by user or shared data set by default, and wherein the dual-system electronic apparatus comprises a third storage device, configured to store shared data of the open operating system and the encryption operating system.

17. The dual-system electronic apparatus of claim 14, wherein the switching circuit is further configured to control the dual-system electronic apparatus to switch between the open operating system and the encryption operating system.

18. The dual-system electronic apparatus of claim 14, wherein the second processor is configured to encrypt data of the encryption operating system.

19. The dual-system electronic apparatus of claim 14, wherein the open operating system and the encryption operating system share the same peripheral equipment.

* * * * *